(12) United States Patent
Lee

(10) Patent No.: US 9,133,541 B2
(45) Date of Patent: Sep. 15, 2015

(54) ARTICLE INCLUDING ENVIRONMENTAL BARRIER COATING SYSTEM

(75) Inventor: Kang N. Lee, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 731 days.

(21) Appl. No.: 12/229,212

(22) Filed: Aug. 20, 2008

(65) Prior Publication Data

US 2009/0178413 A1 Jul. 16, 2009

Related U.S. Application Data

(63) Continuation of application No. PCT/US2007/004355, filed on Feb. 20, 2007.

(60) Provisional application No. 60/775,206, filed on Feb. 20, 2006, provisional application No. 60/775,209, filed on Feb. 20, 2006, provisional application No. 60/775,208, filed on Feb. 20, 2006.

(51) Int. Cl.
| | | |
|---|---|---|
| *F02C 7/00* | (2006.01) | |
| *B32B 18/00* | (2006.01) | |
| *B32B 9/00* | (2006.01) | |
| *F01D 5/28* | (2006.01) | |
| *F01D 9/00* | (2006.01) | |
| *C23C 12/02* | (2006.01) | |
| *C04B 41/00* | (2006.01) | |
| *C04B 41/52* | (2006.01) | |
| *C04B 41/89* | (2006.01) | |
| *C23C 26/00* | (2006.01) | |
| *C23C 28/04* | (2006.01) | |
| *C23C 28/00* | (2006.01) | |

(52) U.S. Cl.
CPC .............. *C23C 12/02* (2013.01); *C04B 41/009* (2013.01); *C04B 41/52* (2013.01); *C04B 41/89* (2013.01); *C23C 26/00* (2013.01); *C23C 28/042* (2013.01); *C23C 28/048* (2013.01); *C23C 28/42* (2013.01)

(58) Field of Classification Search
None
See application file for complete search history.

(56) References Cited

U.S. PATENT DOCUMENTS

| | | | |
|---|---|---|---|
| 3,942,293 A | 3/1976 | Cook | |
| 4,515,860 A | 5/1985 | Holzl | |
| 4,727,930 A * | 3/1988 | Bruckner et al. | 165/111 |
| 5,316,851 A | 5/1994 | Brun et al. | |
| 5,435,889 A | 7/1995 | Dietrich | |
| 5,496,644 A | 3/1996 | Lee et al. | |
| 6,210,791 B1 | 4/2001 | Skoog et al. | |
| 6,299,988 B1 | 10/2001 | Wang et al. | |
| 6,444,335 B1 | 9/2002 | Wang et al. | |
| 6,541,134 B1 | 4/2003 | Strangman et al. | |
| 6,589,677 B1 | 7/2003 | Sun et al. | |

(Continued)

OTHER PUBLICATIONS

Supplementary European Search Report and Search Opinion, EP07751137/PCT/US2007004355, European Patent Office, Munich, Germany, Jul. 2, 2010.

(Continued)

*Primary Examiner* — Vera Katz
(74) *Attorney, Agent, or Firm* — Shumaker & Sieffert, P.A.

(57) ABSTRACT

An enhanced environmental barrier coating for a silicon containing substrate. The enhanced barrier coating may include a bond coat doped with at least one of an alkali metal oxide and an alkali earth metal oxide. The enhanced barrier coating may include a composite mullite bond coat including BSAS and another distinct second phase oxide applied over said surface.

17 Claims, 12 Drawing Sheets

(56) References Cited

U.S. PATENT DOCUMENTS

| | | | |
|---|---|---|---|
| 6,607,852 B2 | 8/2003 | Spitsberg et al. | |
| 6,617,036 B2 | 9/2003 | Eaton et al. | |
| 6,617,037 B2 | 9/2003 | Sun et al. | |
| 6,630,200 B2 * | 10/2003 | Wang et al. | 427/255.26 |
| 6,692,844 B2 | 2/2004 | Sanders | |
| 6,699,607 B1 | 3/2004 | Spitsberg et al. | |
| 6,733,907 B2 | 5/2004 | Morrison et al. | |
| 6,733,908 B1 * | 5/2004 | Lee et al. | 428/702 |
| 6,759,151 B1 | 7/2004 | Lee | |
| 6,777,093 B1 | 8/2004 | Ojard et al. | |
| 6,844,075 B1 | 1/2005 | Saak et al. | |
| 6,902,836 B2 | 6/2005 | Eaton et al. | |
| 6,969,555 B2 | 11/2005 | Meschter et al. | |
| 7,063,894 B2 | 6/2006 | Sun et al. | |
| 7,115,326 B2 | 10/2006 | Spitsberg et al. | |
| 7,115,327 B2 | 10/2006 | Spitsberg et al. | |
| 7,155,326 B2 | 12/2006 | Nagata | |
| 2002/0025454 A1 * | 2/2002 | Wang et al. | 428/698 |
| 2003/0027012 A1 * | 2/2003 | Spitsberg et al. | 428/615 |
| 2003/0138659 A1 | 7/2003 | Shanker | |
| 2003/0224124 A1 * | 12/2003 | Lau et al. | 427/454 |
| 2004/0028941 A1 | 2/2004 | Lane et al. | |
| 2004/0115471 A1 | 6/2004 | Nagaraj et al. | |
| 2004/0175597 A1 | 9/2004 | Litton et al. | |
| 2004/0219295 A1 | 11/2004 | Perepezko et al. | |
| 2005/0003212 A1 | 1/2005 | Sun et al. | |
| 2005/0042461 A1 | 2/2005 | Li et al. | |
| 2005/0255648 A1 * | 11/2005 | Bhatia et al. | 438/218 |
| 2006/0014029 A1 | 1/2006 | Saak et al. | |
| 2006/0029814 A1 | 2/2006 | Bhatia et al. | |
| 2006/0073361 A1 | 4/2006 | Fukudome et al. | |
| 2006/0110609 A1 | 5/2006 | Eaton et al. | |
| 2006/0121293 A1 | 6/2006 | Boutwell et al. | |
| 2006/0154093 A1 * | 7/2006 | Meschter et al. | 428/469 |
| 2006/0166016 A1 | 7/2006 | Spitsberg et al. | |
| 2006/0166017 A1 | 7/2006 | Spitsberg et al. | |
| 2006/0166018 A1 | 7/2006 | Spitsberg et al. | |
| 2006/0211241 A1 | 9/2006 | Govern et al. | |
| 2006/0244143 A1 | 11/2006 | Bhatia et al. | |
| 2006/0280953 A1 | 12/2006 | Hazel et al. | |
| 2006/0280954 A1 | 12/2006 | Spitsberg et al. | |
| 2006/0280955 A1 | 12/2006 | Spitsberg et al. | |
| 2006/0280962 A1 | 12/2006 | Hazel et al. | |
| 2006/0280963 A1 | 12/2006 | Hazel et al. | |
| 2007/0014996 A1 | 1/2007 | Bhatia et al. | |

OTHER PUBLICATIONS

Lee, Kang N., Contamination Effects on Interfacial Porosity during Cyclic Oxidation of Mullite-Coated Silicon Carbide, J. Am. Ceram. Soc. 81 [12] 3329-32 (1998).

Lee, Kang N. and Miller, Robert A., Development and environmental durability of mullite and mullite/YSZ dual layer coatings for SiC an Si3N4 ceramics, Surface and Coatings Technology 86-87 (1996) 142-148.

Kato et al., "Improvement of High-Temperature Endurance of C/C Composites by Double Coating with SiC and Glass Materials," Journal of Chemical Engineering of Japan, vol. 29, No. 4, Feb. 16, 1996, 6 pp.

Examination Report from counterpart European Application No. 07751137.6, dated Apr. 10, 2015, 5 pp.

* cited by examiner

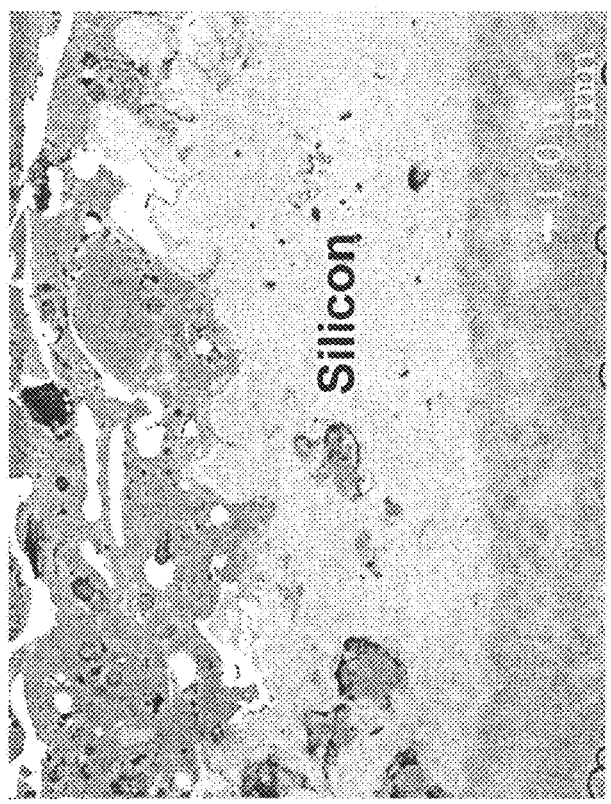
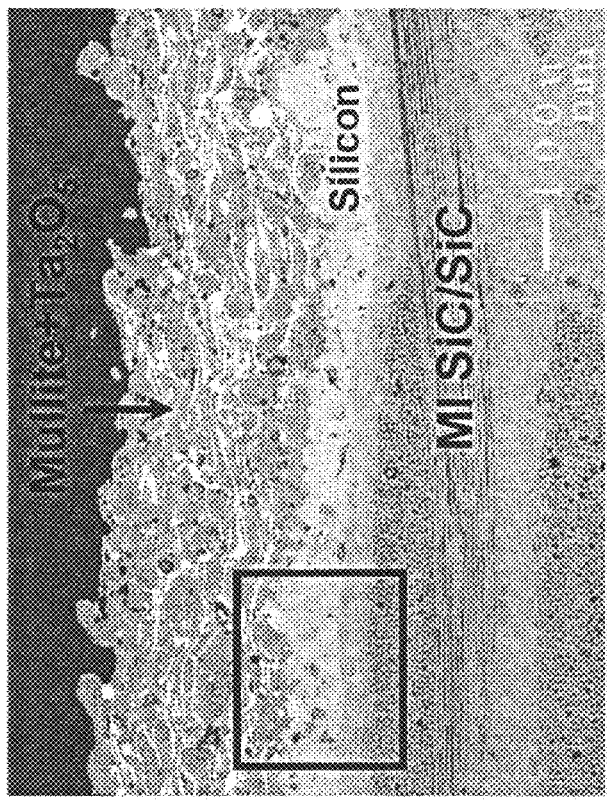
FIGURE 2

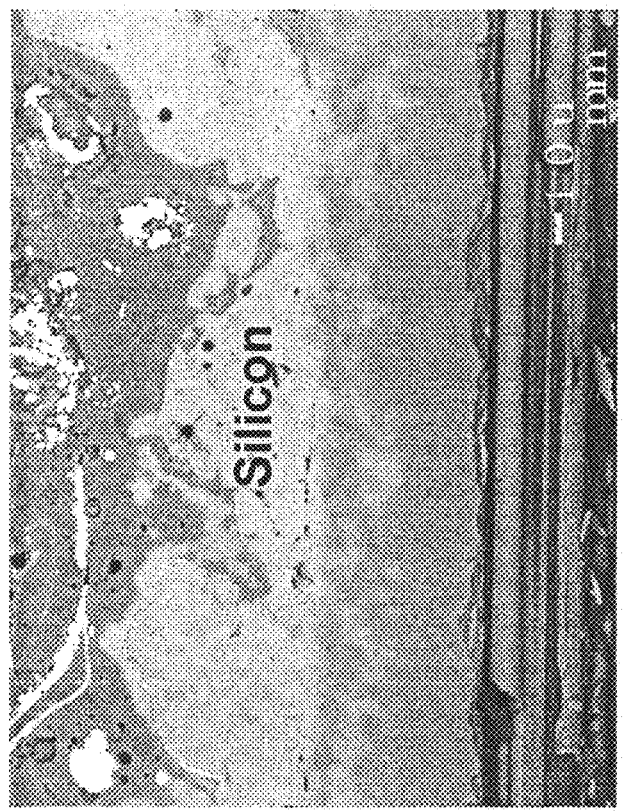
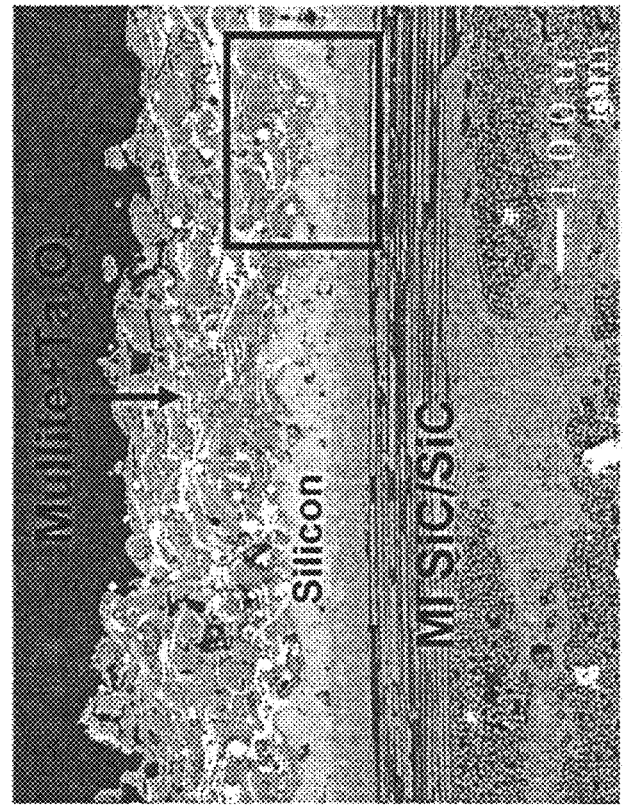
FIGURE 4

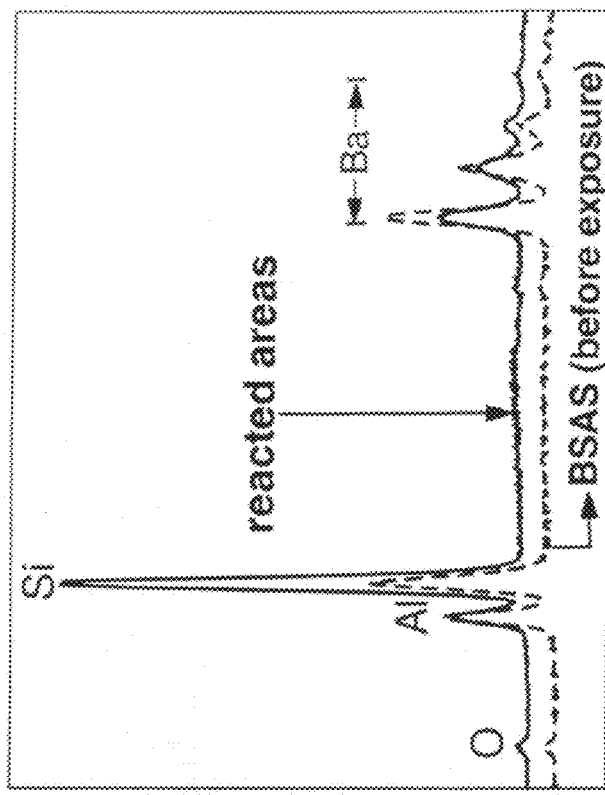
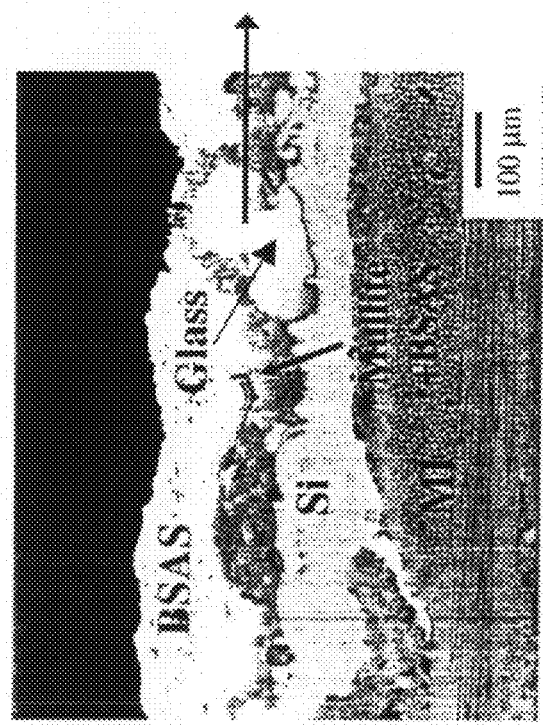
Figure 5

Figure 9

| Top coat | BSAS, HfTiO$_4$, HfO$_2$, RE$_2$SiO$_5$, RE$_2$Si$_2$O$_7$, RE$_2$O$_3$, RE$_2$O$_3$-ZrO$_2$, RE$_2$O$_3$-HfO$_2$, combinations thereof |
|---|---|
| Chemical Barrier | HfSiO$_4$, RE$_2$SiO$_5$, RE$_2$Si$_2$O$_7$, combinations thereof |
| Bond Coat | Si, Mullite, BSAS, RE$_2$SiO$_5$, RE$_2$Si$_2$O$_7$, RE$_2$O$_3$, Ta$_2$O$_5$, combinations thereof; Optionally dope with alkali and alkali earth metal oxides |
| Optional bond coat | Silicon, metal silicides, combinations thereof |

RE: Sc, Y, Lu, Yb, Tm, Er, Ho, Dy, Tb, Gd, Eu, Sm, Nd, La, combinations thereof;

* CB: Chemical barrier; BC: Bond coat; TC: Top coat
** CB, BC+CB, and CB+TC can be a single discreet layer or can form alternating layers with BC and/or TC (BC/CB/BC/CB..., CB/TC/CB/TC..., BC/BC+CB/BC/BC+CB..., CB+TC/TC/CB+TC/TC..., etc),
*** Compositional grading can be created in BC+CB and/or CB+TC

ARTICLE INCLUDING ENVIRONMENTAL BARRIER COATING SYSTEM

CROSS-REFERENCE TO RELATED APPLICATIONS

The present application is a continuation of PCT Patent Application No. PCT/US2007/004355 filed Feb. 20, 2007, which claims the benefit of United States Patent Application Nos. 60/775,206, 60/775,209 and 60/775,208 filed Feb. 20, 2006, each of which are incorporated herein by reference.

GOVERNMENT RIGHTS CLAUSE

This invention was made with United States Government support under Contract NCC3-853 awarded by NASA; the Government has certain rights in this invention.

BACKGROUND

The present inventions relate generally to an environmental barrier coating system for protecting components exposed to severe environmental and thermal conditions such as the hostile environment present in gas turbine engines. While the present inventions were developed for application in gas turbine engines utilization in other devices is contemplated herein.

Designers of gas turbine engines recognize that a limitation to the efficiency and emissions of many gas turbine engines is the temperature capability of metallic components (example, but not limited to blades, vanes, combustor liners) in the engine hot section. Although thermal barrier coatings are used to protect metallic components, thereby allowing the use of higher gas temperatures the metallic components remain a weak link.

Silicon-based ceramics, such as SiC/SiC composites and $Si_3N_4$ ceramics, are prime candidates for hot section components of gas turbine engines. One benefit of silicon-based ceramic engine components is their excellent high temperature mechanical, physical and chemical properties which allow gas turbine engines to operate at higher temperatures than current engines utilizing superalloy components. Higher engine operation temperature translates into significantly reduced emission (pollution) and increased fuel efficiency.

However, silicon based ceramic materials suffer from rapid recession in combustion environments due to the volatilization of silica scale by water vapor. This is a significant drawback in the utilization of silicon-based ceramics in gas turbine engines. Therefore, there is a need to identify techniques to limit/prevent the volatilization of silicon-based ceramics in engine operating environments. One technique is to utilize environmental barrier coatings (EBC) that provide the environmental protection for silicon-based ceramics. Current EBCs comprise a bond coat that provides the adherence onto the substrate and a topcoat that provides the environmental protection. The present inventions provide a novel and unobvious environmental barrier coating system.

SUMMARY

In one embodiment of the present application, a unique environmental barrier coating is provided to protect a substrate. Other embodiments include unique apparatus, methods, devices, and systems to provide environmental barrier coating protection for a substrate. Further embodiments, forms, features, aspects, benefits, and advantages of the present application shall become apparent from the description and figures provided herewith.

BRIEF DESCRIPTION OF THE FIGURES

FIG. 2 is a cross sectional view of one embodiment of a silicon/mullite+$Ta_2O_5$-coated SiC substrate.

FIG. 4 is a cross sectional view of one embodiment of a silicon/mullite+$Ta_2O_5$-coated SiC substrate after 300 hours with 1 hr cycles at 1400° C.

FIG. 5 is a view of the silicon/(mullite+BSAS)/BSAS-coated SiC in which BSAS/silica reaction produced low melting glasses after 300 hours at 1400° C.

FIG. 9 is a chart illustrating various components of environmental barrier coatings.

DETAILED DESCRIPTION OF REPRESENTATIVE EMBODIMENTS

Figure 1:
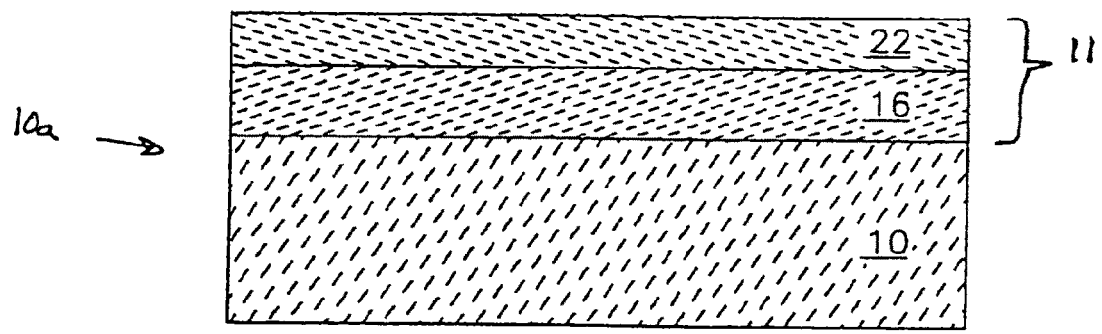
FIG. 1 is an illustrative cross sectional view of one embodiment of an environmental barrier coating of the present invention on a substrate.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present invention is directed to an article/component which can withstand an operating environment associated with, but not limited to, the hot section of a gas turbine engine and/or heat exchanger. The article is coated by an environmental barrier coating that in one form resists degradation in various environments including a high temperature water-vapor containing combustion environment and/or an environment containing molten salts or CMAS (calcium magnesium aluminum silicate). The present application discloses many things including, but not limited to improving the durability of mullite bond coats by enhancing crack resistance and/or improving adherence.

With reference to FIG. 1, there is illustrated an illustrative cross sectional view of an article 10a including one embodiment of an environment barrier coating 11. The article 10a may be any type of component/part/structure but is preferably a gas turbine engine component/article such as a combustor liner, blade, vane, and blade track. The article 10a includes substrate 10 and preferably the substrate 10 is a silicon containing substrate. However, the present application also contemplates non-silicon containing substrates. The silicon-containing substrate 10 may be any silicon-containing ceramic material such as silicon carbide, silicon nitride, silicon carbon nitride, silicon oxynitride, and silicon aluminum oxynitride. The silicon-containing ceramic substrate could also be silicon containing ceramic matrix reinforced with ceramic fibers, whiskers, platelets, and chopped or continuous fibers. The silicon-containing substrate may also be silicon-containing metal alloy such as molybdenum-silicon alloys, niobium-silicon alloys, and other Si-containing alloys. The substrate may also be carbon fiber reinforced silicon carbide matrix (C/SiC) composites, silicon carbide fiber reinforced carbon matrix (SiC/C) composites, carbon fiber reinforced carbon matrix (C/C) composites, and oxide fiber reinforced oxide matrix (oxide/oxide) composites.

In one form of the present invention a bond coat 16 is located between the substrate 10 and a topcoat 22. The bond coat 16 and the top coat 22 are included within the environmental barrier coating 11. The present inventions contemplate an optional bond coat (not illustrated) between the substrate 10 and the bond coat 16. The optional bond coat may be silicon, metal suicides or combinations thereof. In one form the content of the silicon is within the range of 1 wt. % to 30 wt. % and in another form in the range of 10 wt. % to 30 wt. %. However, other quantities of the optional bond coat are contemplated herein. The present invention contemplates embodiments wherein other layer(s)/coating(s) may be utilized with the bond coat 16 and the top coat 22. The environmental barrier coatings contemplated herein may be applied by any conventional method, such as plasma spraying, EB-PVD, slurry-based processes, CVD, PVD, etc. Details regarding the application of the coating(s) to the substrate are believed generally known to one of ordinary skill in the art and will not be set forth herein.

Known bond coats include mullite (i.e. U.S. Pat. Nos. 5,391,404 and 5,496,644),/mullite+an alkaline/alkaline earth metal aluminosilicate such as barium strontium aluminosilicate (BSAS) (i.e. U.S. Pat. Nos. 6,485,848, 6,387,456 and 6,410,148). Mullite is a $3Al_2O_3$—$2SiO_2$ compound and BSAS is a BaO—SrO—$Al_2O_3$—$SiO_2$ compound with celsian structure. Mullite has a close coefficient of thermal expansion match and excellent chemical compatibility with silicon-based ceramics; the close thermal expansion match and chemical compatibility are ideal conditions for a bond coat. The bond coat system comprising silicon and a mixture of mullite and BSAS has been developed that has superior crack resistance and durability compared to mullite bond coat.

Mullite has the tendency to develop through-thickness cracks under thermal exposure and lacks the chemical adherence onto silicon-based ceramics. As a result, in long-term exposures in combustion environments, the water vapor from the combustion environment readily travels through the cracks. Because of the lack of chemical adherence, the water vapor attacks the interface, causing enhanced oxidation and premature failure of the coating.

Mullite+BSAS has superior crack resistance compared to mullite, however, BSAS reacts with the silica scale that forms on the surface of the silicon-based ceramics. This reaction produces low-melting reaction products, which have detrimental effects on the environmental barrier coating durability. Firstly, the low-melting products cause the development of pores and weaken the interfacial adherence, leading to the spallation of environmental barrier coating. Secondly, the low-melting products readily seep into pores and open spaces in the environmental barrier coating, deteriorating the thermal insulation capability of the environmental barrier coating. Thirdly, the low melting reaction products react with the topcoat, leading to the deterioration of the topcoat. Another durability issue with the mullite+BSAS bond coat is the chemical reactivity between BSAS and topcoat. These chemical reactions gradually change the physical and chemical characteristics of the mullite+BSAS bond coat. The degeneration of mullite+BSAS bond coat accelerates with increasing temperature, becoming a significant durability issue for long-term applications (>1000 hrs) at temperatures over 1300° C. As the materials technology progresses, Si-based ceramics with temperature capability over 1300° C. are being developed. Therefore, the present inventions address a need for a bond coat durable at temperatures over 1300° C. to take the full advantage of advanced high temperature Si-based ceramics.

In one form the present application is directed to improving the durability of the bond coat by improving crack resistance. Equation (1) shows coating thermal stress in a coated SiC. According to equation (1) key factors that affect the coating thermal stress are thermal expansion mismatch, amplitude of temperature cycling, and Young's modulus of the coating. Therefore, coating thermal stress can be minimized by minimizing the coefficient of thermal expansion mismatch and the Young's modulus of coating.

$$\sigma_{thermal} = (\alpha_c - \alpha_{SiC})\Delta T \frac{E_c}{(1-\nu_c)} \qquad (1)$$

Where
$\alpha_c$=thermal expansion coefficient of coating
$\alpha_{SiC}$=thermal expansion coefficient of substrate
$\Delta T$=temperature difference between hot cycle and cold cycle
$E_c$=Young's modulus of coating
$\nu_c$=Poisson's ratio of coating Since crack resistance of coatings is directly related to the coating thermal stress, it is noted that the crack resistance of the coatings can be improved by reducing the coefficient of thermal expansion mismatch and/or Young's modulus of coating. It is proposed that the improved crack resistance of mullite+BSAS coating compared to mullite coating is the result of reduced Young's modulus, due to the addition of low modulus BSAS. In one form, a low modulus oxide, such as $Ta_2O_5$, was added in the mullite coating on SiC, and was exposed to one-hour thermal cycling at 1316° C.-1400° C. in a simulated combustion environment (90% $H_2O$-10% $O_2$).

Figure 3:
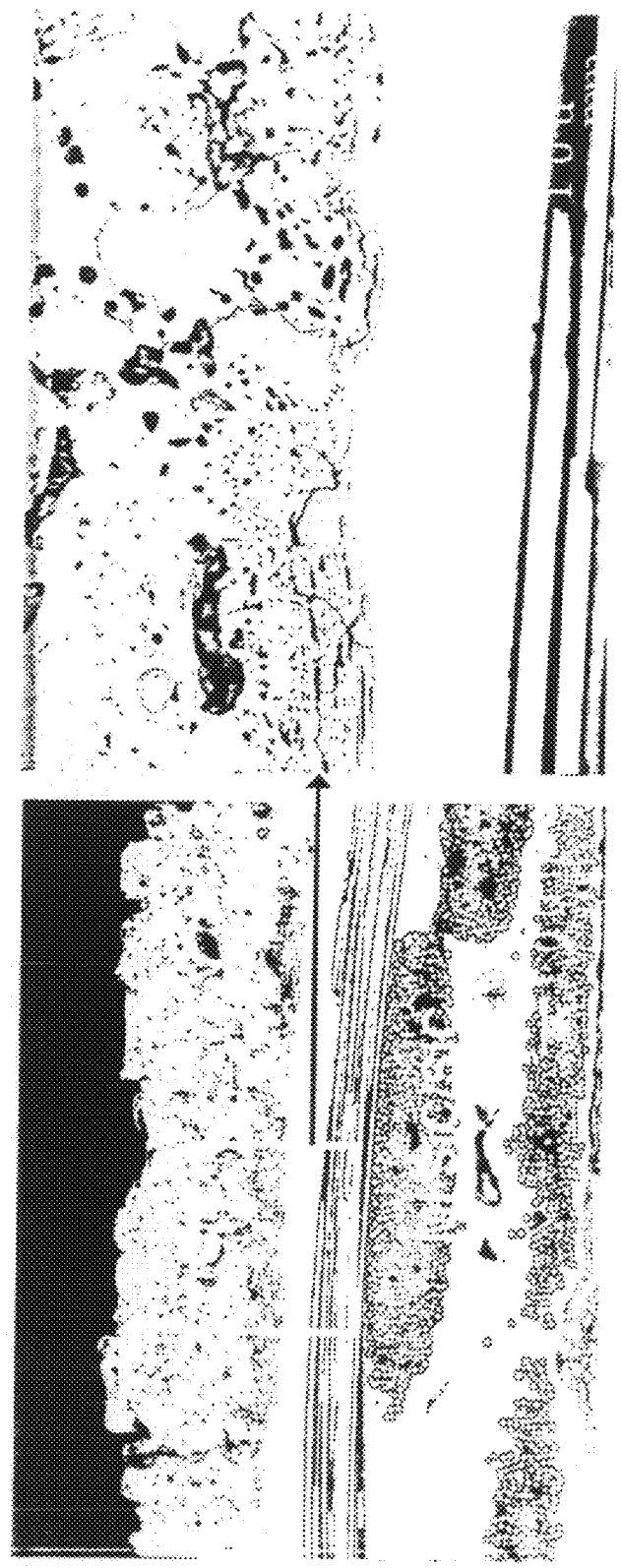
FIG. 3 is a cross sectional view of one embodiment of a silicon/mullite-coated SiC substrate.

With reference to FIGS. 2 and 3, there is illustrated the comparison of the cross-section of silicon/mullite+$Ta_2O_5$-coated SiC and silicon/mullite-coated SiC after 1000 hrs and 690 hrs, respectively, with 1 hr cycles at 1316° C. The silicon/mullite+$Ta_2O_5$-coated SiC (FIG. 2) maintained excellent oxidation resistance, chemical stability and adherence as evidenced by the intact silicon bond coat, the absence of silica scale, and the lack of chemical reaction. On the other hand, the silicon/mullite-coated SiC (FIG. 3) showed poor oxidation resistance as evidenced by the loss of the silicon bond coat and the formation of thick porous silica scale.

With reference to FIG. 4, there is illustrated a cross-section of silicon/mullite+$Ta_2O_5$-coated SiC after 300 hours with 1 hr cycles at 1400° C. Again, the coating maintained excellent oxidation resistance, chemical stability and adherence. This is in contrast to the silicon/mullite-coated SiC in which the mullite coating severely delaminated with the formation of thick silica scale after 300 hours at 1400° C. (no figure shown), and the (mullite+BSAS)/BSAS-coated SiC (FIG. 5) in which BSAS/silica reaction produced low melting glasses after 300 hours at 1400° C. The low melting glasses in the environmental barrier coatings having (mullite+BSAS) bond coat severely limit the environmental barrier coating life at temperatures over 1300° C. The present application contemplates the bond coat 16 may include Si, mullite, BSAS, $RE_2SiO_5$, $RE_2Si_2O_7$, $RE_2O_3$, and combinations thereof. For the readers assistance RE symbolizes the rare earth elements (Sc, Y, Lu, Yb, Tm, Er, Ho, Dy, Tb, Gd, Eu, Sm, Nd, La). Although not as dramatic as $Ta_2O_5$, significant improvement in coating durability was observed with the addition of $Yb_2SiO_5$.

The modulus of $Ta_2O_5$ is between ~110 GPa and ~130 GPa which is lower than that of mullite (~150 GPa), however, the modulus of rare earth silicate ($RE_2SiO_5$, $RE_2Si_2O_7$) is close to that of mullite. This suggests that some factors besides the modulus may be contributing to the improved durability of mullite modified by adding a second phase oxide. One possibility is that the coating simply becomes tougher with the addition of a second phase. The present application includes a durable crack-resistant mullite coating modified by adding a second phase oxide ("composite mullite coating"), preferably low modulus oxides. The second phase oxides include oxides, doped oxides and oxide compounds of transition metals and rare earth elements. Preferred oxides include $Ta_2O_5$ and $Ta_2O_5$-containing oxides, $Nb_2O_5$ and $Nb_2O_5$-containing oxides, $VO_2$ and $VO_2$-containing oxides, $TiO_2$ and $TiO_2$-containing oxides, $ZrO_2$ and $ZrO_2$-containing oxides, $HfO_2$ and $HfO_2$-containing oxides, rare earth oxides (including $Sc_2O_3$ and $Y_2O_3$) and rare earth oxide-containing oxides (including rare earth silicates), NZP family ceramics, and combinations thereof. Si may be added in the second phase to further increase the bonding. The content of the second phase oxide is more than zero wt. % and less than 100 wt. %. In one form the content of the second phase oxide is within a range of 0 wt. %-50 wt. %. In another form the content of the second phase oxide is within a range of 1 wt. %-30 wt. %.

The second phase oxide may be any combination of oxides listed above. Further, in one form of the present invention the second phase oxide is not defined by BSAS, and in another form of the present application the combination of second phase oxides includes at least one second phase oxide in addition to BSAS. The "composite mullite coating" may be combined with the modification of the mullite coating by doping with alkali and alkali earth metal oxides as set forth in U.S. Provisional Patent Application entitled Alkali and Alkali Earth Metal Oxide Doped Adherent Mullite Coating. Further details regarding the mullite coating doped with alkali and alkali earth metal oxides are provided below. The "composite mullite coating" may be applied on the silicon-based substrate by any suitable method including plasma spraying techniques.

In one form, the present invention provides for substantially higher temperature capability due to the elimination of BSAS second phase from mullite bond coat.

With reference to FIGS. 1 and 6-8, there will be described aspects of the present invention directed to improving the durability of mullite bond coat by improving the adherence. One means to improve the adherence of a coating is by creating an interphase between the coating and the substrate that bond well onto both the coating and the substrate. When mullite-coated silicon-based ceramics are exposed to high temperatures, silica scale grows on the silicon-based ceramics, forming an interphase between the mullite and the substrate. The formation of pure silica scale, however, is detrimental to mullite adherence because it does not bond well onto mullite. Besides the poor adherence onto mullite, silica scale, which is initially amorphous, eventually transforms to cristobalite. This phase transformation is accompanied by a volumetric expansion, leading to cracking of the scale and the deterioration of coating durability.

Introduction of alkali metal or alkali earth metal oxides into silica creates gaps in the continuous network structure in silica. This changes the properties of silica such as reduction in viscosity. A low viscosity silica scale can act like a glue and thus improve the adherence of the mullite bond coat. In one form of the present invention, the viscosity of silica scale was reduced in a controlled manner by doping the mullite bond coat with an alkali or alkali earth metal oxide, which went into the silica scale. As discussed previously, the present application fully contemplates doping the bond coats discussed above and in reference to FIGS. 2-5 and other bond coats.

In one embodiment a mullite bond coat was doped with a small amount of $Li_2O$ or $Na_2O$ (less than 50 wt. %). The doped mullite-coated SiC, with or without an additional silicon bond coat, showed significantly improved durability when exposed to a simulated combustion environment (90% H2O-balance $O_2$, 1 hr cycling, 1300-1400° C.). The inventor recognizes that too much of $Li_2O$ or $Na_2O$ in the mullite coating is detrimental to the durability because silica scale with too low viscosity will cause accelerated oxygen transport, formation of pores and premature coating spallation. The upper limit of the dopant concentration depends on the temperature and the type of dopant. Smaller amount of dopant is required at higher temperatures because viscosity decreases with increasing temperature. The content of the dopant is more than zero wt. % and less than 10 wt. %. In one form the content of the dopant is within the range of 0.1 wt. %-5 wt. %.

Since all alkali and alkali earth metal oxides are network-modifying oxides they all have similar effect in reducing the viscosity of silica. Therefore, all common alkali and alkali metal oxides, i.e., $Li_2O$, BeO, $Na_2O$, MgO, $K_2O$, CaO, SrO, BaO, and combinations thereof are contemplated as dopant in the present invention. In one form, the dopant may be incorporated in metallic from, i.e., Li, Be, Na, Mg, K, Ca, Sr, and Ba. In another form, Si may be added in the doped mullite bond coat to further increase the bonding.

A silicon bond coat may be applied between the silicon-based substrate and mullite bond coat. Overlay coatings may be applied on top of the doped mullite coating. The doped mullite coating may be used as an intermediate coating.

Figure 6:
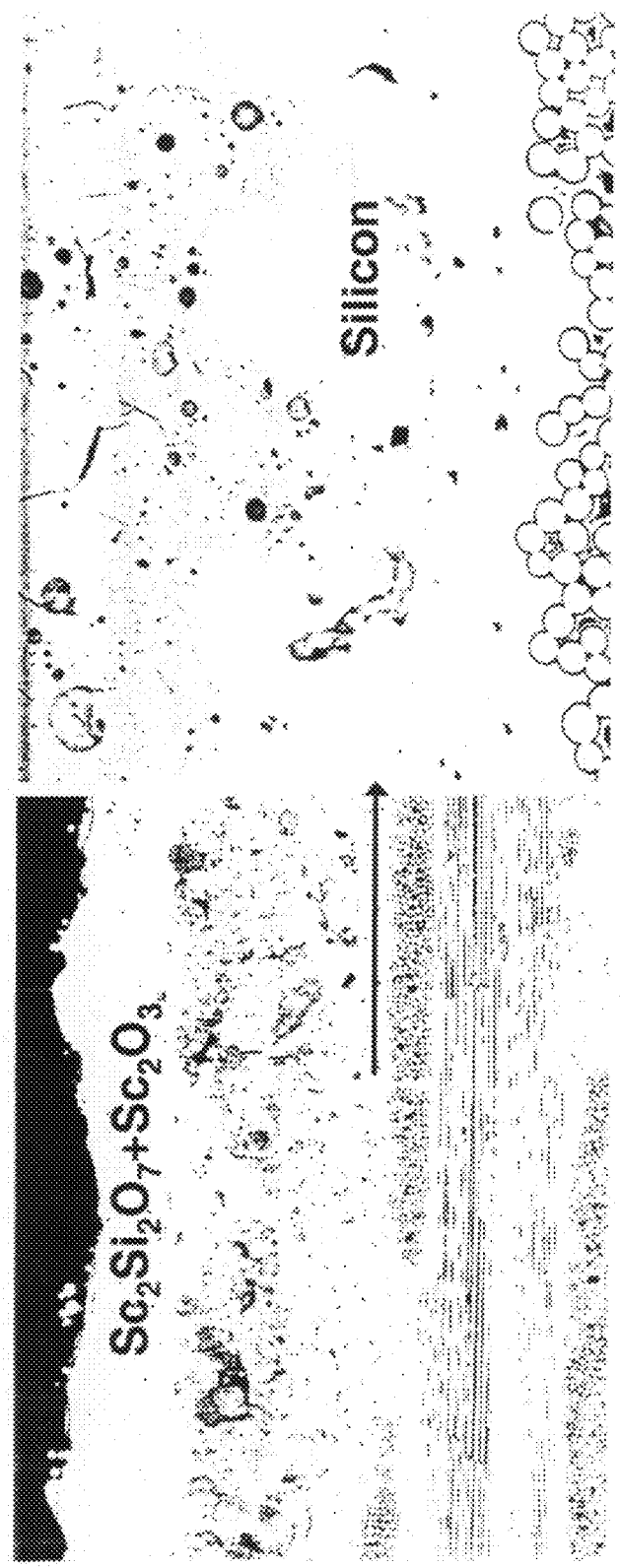
FIG. 6 is a cross-section of a silicon/(mullite+$Na_2O$)/($Sc_2Si_2O_7$+$Sc_2O_3$) coated SiC substrate after 400 hours at 1316° C. with one hour cycles in a simulated combustion environment (90% $H_2O$-balance $O_2$.)
Figure 7:
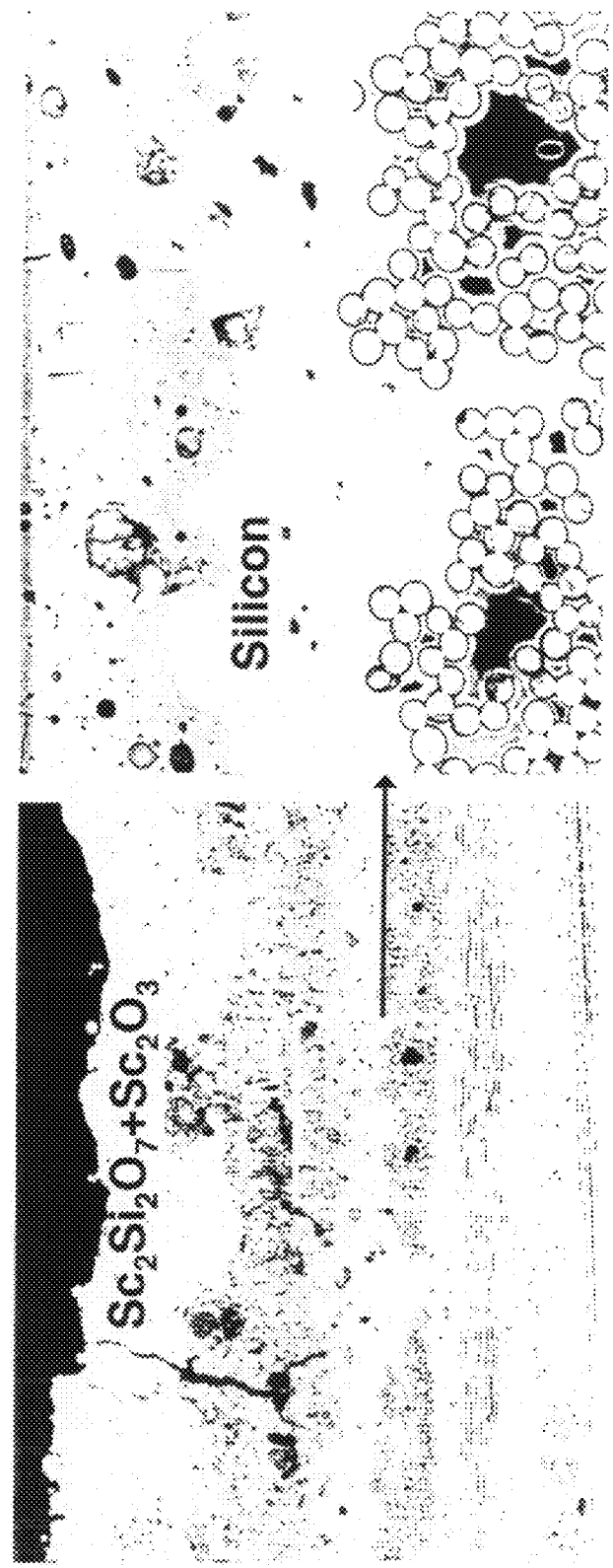
FIG. 7 is a cross section of a silicon/(mullite+$Na_2O$)/($Sc_2Si_2O_7$+$Sc_2O_3$) coated SiC substrate.
Figure 8:
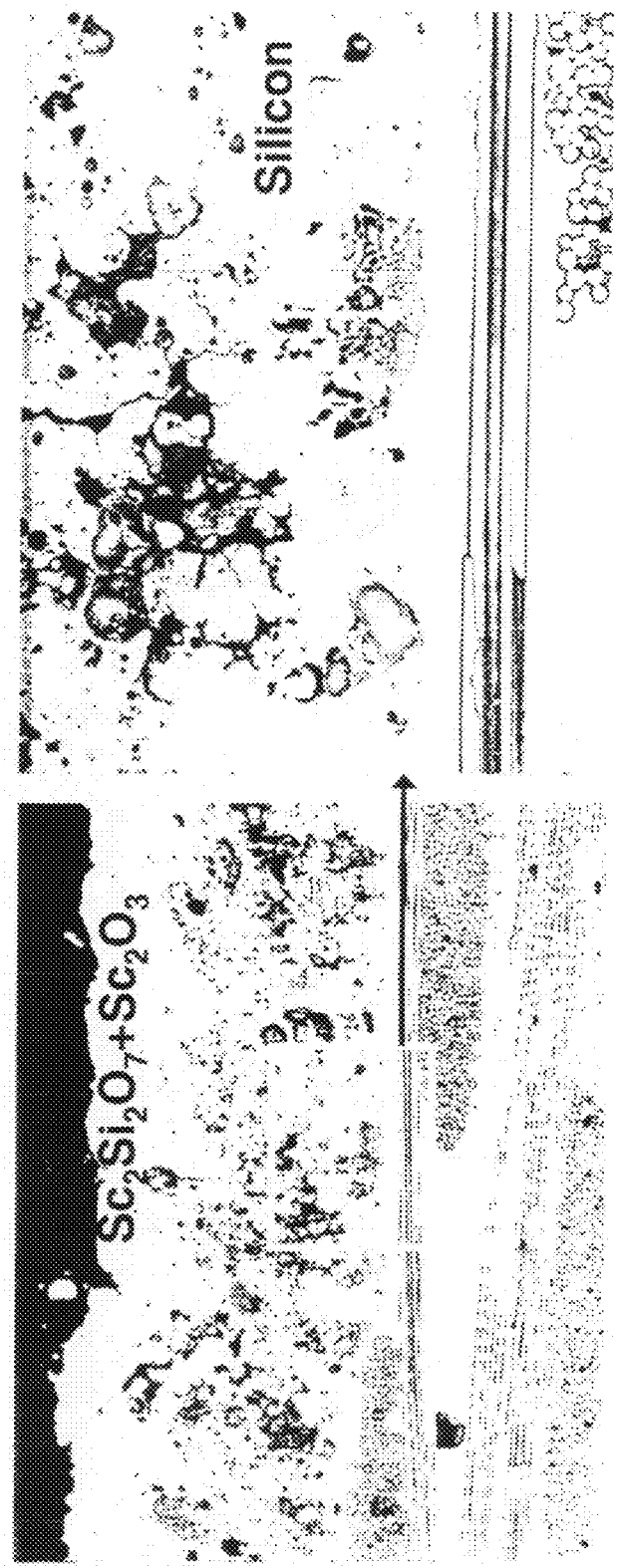
FIG. 8 is a cross section of a silicon/mullite/($Sc_2Si_2O_7$+$Sc_2O_3$) coated SiC substrate.

With reference to FIG. 6, there is illustrated the cross-section of silicon/(mullite+$Na_2O$)/($Sc_2Si_2O_7$+$Sc_2O_3$) after 400 hours at 1316° C. with one hour cycles in a simulated combustion environment (90% $H_2O$-balance $O_2$). The silicon/(mullite+$Na_2O$)/($Sc_2Si_2O_7$+$Sc_2O_3$) coated SiC maintained excellent oxidation resistance, chemically stability and adherence as evidenced by the intact silicon bond coat, the absence of silica scale, and the lack of chemical reaction. On the other hand, the Si/Mullite/$Sc_2Si_2O_7$+$Sc_2O_3$ coated SiC showed extensive oxidation of Si bond coat after the same exposure. FIGS. 7 and 8 compare the cross-section of silicon/(mullite+$Na_2O$)/($Sc_2Si_2O_7$+$Sc_2O_3$) coated SiC and Si/Mullite/$Sc_2Si_2O_7$+$Sc_2O_3$ coated SiC after 300 at 1400° C. with one hour cycles in a simulated combustion environment (90% $H_2O$-balance $O_2$). Again, the silicon/(mullite+$Na_2O$)/($Sc_2Si_2O_7$+$Sc_2O_3$) coated SiC (FIG. 7) maintained excellent oxidation resistance, chemical stability and adherence as evidenced by the intact silicon bond coat, the absence of silica scale and the lack of chemical reaction. This is in contrast to the silicon/mullite/($Sc_2Si_2O_7+Sc_2O_3$) coated SiC (FIG. 8) which showed poor oxidation resistance as evidenced by the loss of the silicon bond coat and the formation of thick porous scale. This data demonstrates the effect of doping with an Alkali and Alkali Earth metal oxide.

Chemical reactions occur at the bond coat/top coat interface in long-term exposures and/or at very high temperatures (>1400° C.). Chemical reactions may alter the chemistry of the bond coat and the top coat, which leads to deleterious physical and mechanical changes of environmental barrier coating layers, such as thermal conductivity, density, modulus, thermal expansion coefficient, etc. Therefore, it is often desirable to limit the deleterious chemical reactions between the layers to maximize the environmental barrier coating life. As discussed previously the environmental barrier coating may be considered to include bond coat, top coat and other material coats/layers utilized to protect the substrate. For example, some rare earth oxide components such as yttria (one key stabilizer for zirconia and hafnia) readily react with mullite forming a low melting (<1400° C.) products, which can significantly alter the coating properties and shorten the life. Many current environmental barrier coatings having stabilized zirconia or hafnia develop a large coefficient of thermal expansion mismatch strain, limiting the T/EBC life by causing cracking and delamination.

Extensive chemical compatibility studies at 1500° C. showed that $HfSiO_4$ has excellent chemical compatibility with mullite, BSAS, rare earth silicate, rare earth oxide-stabilized zirconia, and rare earth oxide-stabilized hafnia. Some rare earth silicates ($RE_2SiO_5$ or $RE_2Si_2O_7$: RE=Yb, Lu, Sc) also show excellent chemical compatibility with mullite, BSAS, rare earth oxide-stabilized zirconia, and rare earth oxide-stabilized hafnia. Besides the chemical compatibility, $HfSiO_4$, $RE_2SiO_5$, and $RE_2Si_2O_7$ have good coefficient of thermal expansion match with the mullite-based bond coat and SiC or $Si_3N_4$ substrate, making them excellent candidates for the chemical barrier. A low modulus chemical barrier can be a compliant layer as well relaxing the coefficient of thermal expansion mismatch strain. FIG. 9 illustrates various components of environmental barrier coatings. The top coat can be BSAS, $HfTiO_4$, $HfO_2$, $RE_2SiO_5$, $RE_2Si_2O_7$, $RE_2O_3$, $RE_2O_3$—$ZrO_2$, $RE_2O_3$—$HfO_2$, and combinations thereof, where RE=Sc, Y, Lu, Yb, Tm, Er, Ho, Dy, Tb, Gd, Eu, Sm, Nd, La. The present application further contemplates the combination of the RE materials. In one form the total content of $RE_2O_3$ in $RE_2O_3$—$ZrO_2$ $_{and\ RE2}O_3$—$HfO_2$ is more than 1 mol % and less than 20 mol %. In a preferred form the content of $RE_2O_3$ in $RE_2O_3$—$ZrO_2$ and $RE_2O_3$—$HfO_2$ is 4 mol %-10 mol %.

Figure 10:
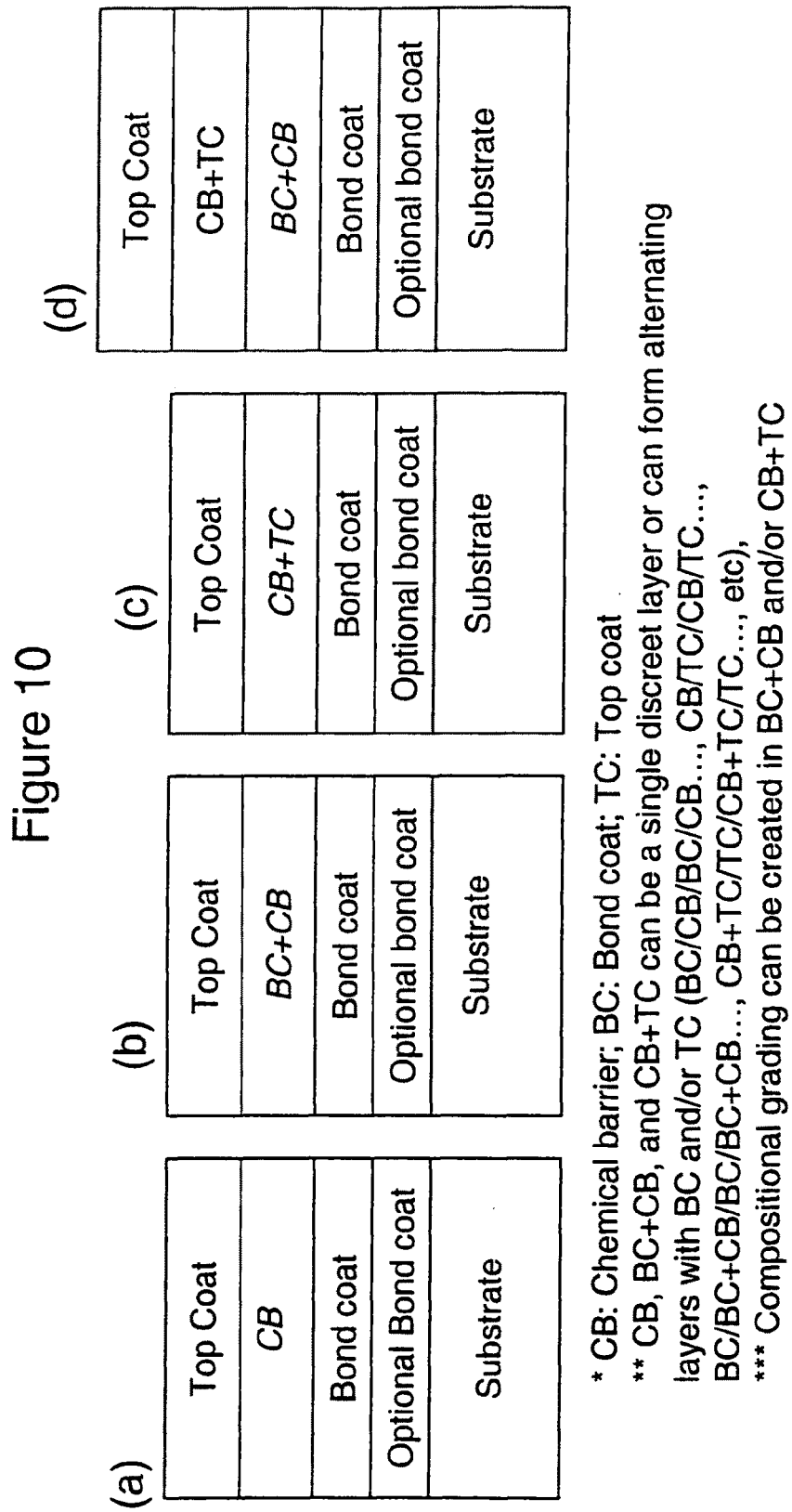
FIG. 10 illustrates various embodiments incorporating a chemical barrier into multilayer environmental barrier coating systems.

The chemical barrier can be incorporated as a discreet layer, a graded layer, a mechanical mixture with the bond coat and/or the top coat, alternating multilayers with the bond coat and/or the top coat, or combinations thereof. FIG. 10 shows various examples of incorporating the chemical barrier into multilayer environmental barrier coating systems. The graded layer and alternating layers should help spread out the coefficient of thermal expansion mismatch strain in the case of a high coefficient of thermal expansion top coat (stabilized zirconia and hafnia). Alternating multilayers should help toughen the environmental barrier coating by creating a composite layer.

Figure 11:
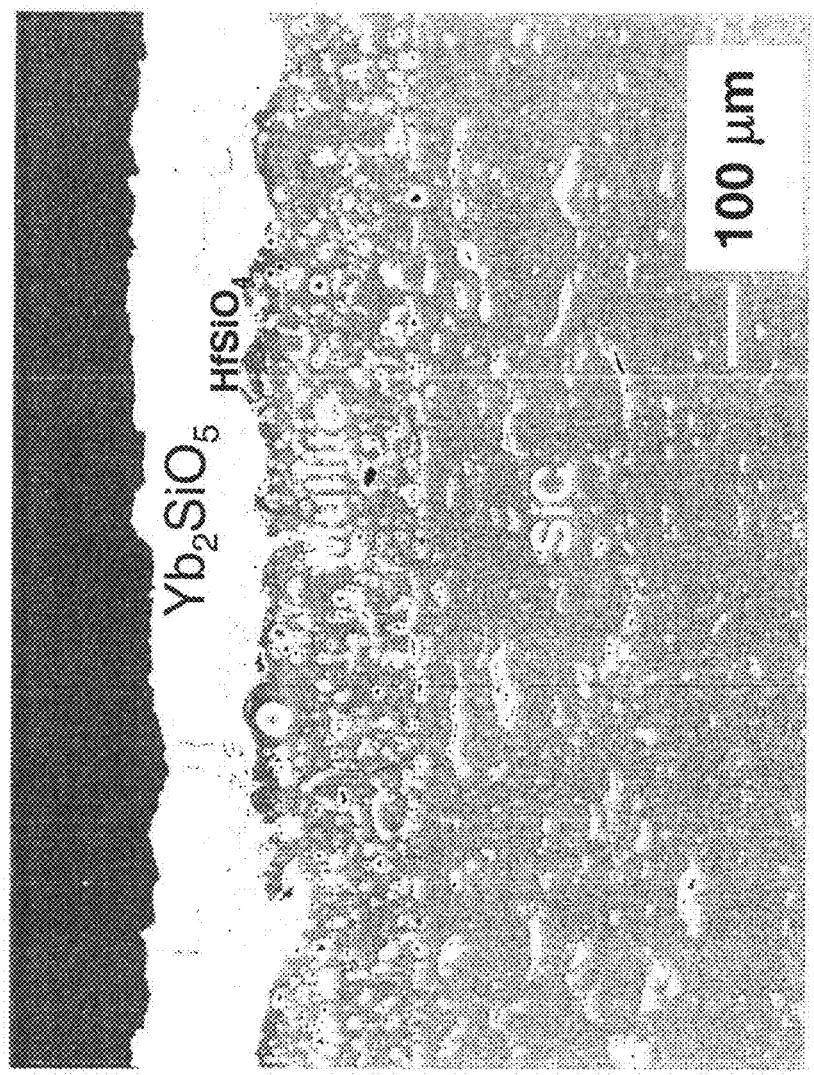
FIG. 11 illustrates one embodiment of a single, discreet $HfSiO_4$ chemical barrier between the mullite bond coat and the $Yb_2SiO_5$ top coat.
Figure 12:
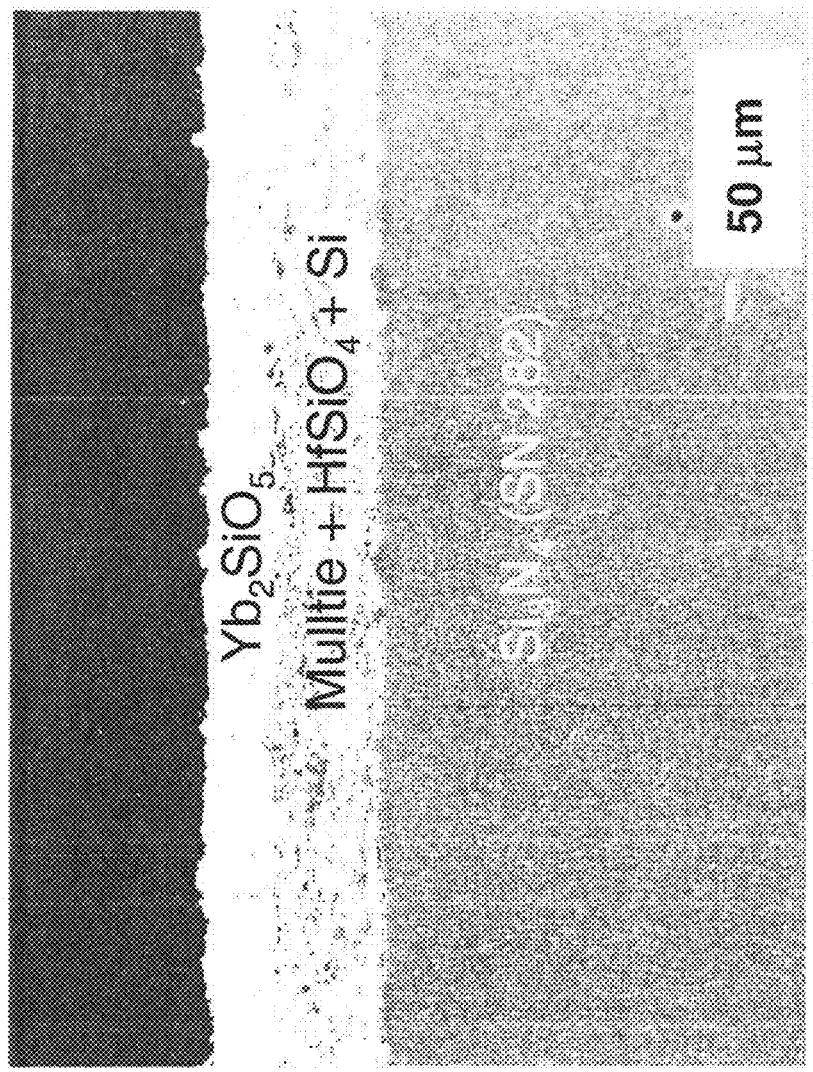
FIG. 12 illustrates one embodiment incorporating HfSiO4 in the bond coat (mullite+Si) via mechanical mixing.

FIG. 11 shows an example of a single, discreet $HfSiO_4$ chemical barrier between the mullite bond coat and the $Yb_2SiO_5$ top coat, and FIG. 12 shows an example of incorporating $HfSiO_4$ in the bond coat (mullite+Si) via mechanical mixing. The environmental barrier coating maintained excellent environmental, chemical and mechanical durability in simulated combustion environments (FIG. 11: 1450° C., 1 hr cycles, 100 hr, 90% $H_2O$-bal. $O_2$; FIG. 12: 1430° C., 1 hr cycles, 100 hr, 90% $H_2O$-bal. $O_2$). The benefits of the chemical barrier in these examples are as follows. In the case of FIG. 11, the chemical barrier makes the coating more robust by preventing chemical reaction and/or delamination at the top coat/bond coat interface in very high temperature exposures (≧1450° C.). In the case of FIG. 12, the $HfSiO_4$ component prevents the deleterious chemical reaction between mullite and the additives (rare earth oxides) in $Si_3N_4$. The mullite bond coat readily delaminates without the $HfSiO_4$ component.

One form of the present application contemplates an apparatus comprising: a silicon based ceramic substrate; and, a composite mullite coating applied over at least a portion of the ceramic substrate. Another aspect of the present application contemplates the composite coating includes mullite and $Ta_2O_5$. Another aspect of the present application contemplates the composite coating includes a second phase oxide. Yet another aspect of the present application contemplates the oxide includes at least one of $Ta_2O_5$ and $Ta_2O_5$-containing oxides, $Nb_2O_5$ and $Nb_2O_5$-containing oxides, $VO_2$ and $VO_2$-containing oxides, $TiO_2$ and $TiO_2$-containing oxides, $ZrO_2$ and $ZrO_2$-containing oxides, $HfO_2$ and $HfO_2$-containing oxides, rare earth oxides, and rare earth oxide-containing oxides (including rare earth silicates), NZP ceramics.

Another form of the present application contemplates a gas turbine engine component, comprising: a silicon based ceramic component; and coating means applied over at least a portion of said structure for preventing the volatilization of said ceramic component.

Another form of the present application contemplates an apparatus comprising: a silicon based ceramic structure; and a mullite bond coat doped with an alkali metal or alkali earth metal oxide applied over at least a portion of said ceramic structure.

Another form of the present application contemplates an apparatus comprising: a silicon based ceramic component; and a mullite bond coat doped with dopant means for reducing the viscosity of silica. Another aspect of the present application contemplates the dopant means is defined by an alkali metal or alkali earth metal oxide. Yet another aspect of the present application contemplates the dopant means is defined by a combination of alkali metal and/or alkali earth metal oxides. Yet another aspect of the present application contemplates the addition of a silicon bond coat applied on at least a portion of the ceramic structure, and the mullite bond coat is applied over said silicon bond coat.

Another form of the present application contemplates an apparatus comprising: a silicon based ceramic body; a mullite bond coat applied over a portion of said ceramic body; a chemical barrier applied over said mullite bond coat; and a topcoat applied over said chemical barrier.

Another form of the present application contemplates an apparatus comprising: a silicon based ceramic substrate; a mullite bond coat; a low modulus chemical barrier applied over said bond coat; and a topcoat applied over said chemical barrier.

Another form of the present application contemplates an apparatus comprising: a silicon based ceramic body; a mullite bond coat applied over a portion of said ceramic body; a topcoat; and barrier means applied over said mullite bond coat and beneath said topcoat for preventing chemical reaction and/or delamination at the topcoat/bond coat interface.

Another form of the present application contemplates a method comprising: forming a bond coat including mullite on a silicon containing substrate; forming a silica scale on at least a portion of the substrate; and introducing at least one of an alkali metal oxide and an alkali earth metal oxide into the silica scale. Another aspect of the present application contemplates wherein in said introducing the at least one of an alkali metal oxide and an alkali earth metal oxide come from the bond coat. Another aspect of the present application contemplates the content of the at least one of an alkali metal oxide and an alkali earth metal oxide in the bond coat is more than zero wt. % and less than 10 wt. %. Another aspect of the present application contemplates that the content of the at least one of an alkali metal oxide and an alkali earth metal oxide in the bond coat is within the range of 0.1 wt. % to 5 wt. %. Another aspect of the present application contemplates that the bond coat includes a dopant in a metallic form, wherein the dopant is selected from the group consisting of Li, Be, Na, Mg, K, Ca, Sr, and Ba and combinations thereof. Another aspect of the present application contemplates that in said introducing the at least one alkali metal oxide and an alkali earth metal oxide is selected from the group consisting of $Li_2O$, BeO, $Na_2O$, MgO, $K_2O$, CaO, SrO, BaO and combinations thereof. Another aspect of the present application contemplates forming a second bond coat between the substrate and the bond coat, wherein the second bond coat is selected from the group consisting of silicon, metal suicides and combinations thereof. Another aspect of the present application contemplates forming gaps in the continuous network structure of the silica. Another aspect of the present application contemplates adhering the bond coat to the substrate. Another aspect of the present application contemplates applying a top coat over the bond coat. Another aspect of the present application contemplates that the top coat is selected from the group consisting of BSAS, $HfTiO_4$, $HfO_2$, $RE_2SiO_5$, $RE_2Si_2O_7$, $RE_2O_3$, $RE_2O_3$—$ZrO_2$, $RE_2O_3$—$HfO_2$, and combinations thereof. Another aspect of the present application contemplates applying a chemical barrier between the top coat and the bond coat. Another aspect of the present application contemplates that the chemical barrier is selected from the group consisting of $HfSiO_4$, $RE_2SiO_5$, and $RE_2Si_2O_7$ and combinations thereof. Another aspect of the present application contemplates that the chemical barrier is a discrete layer. Another aspect of the present application contemplates that the chemical barrier is a mechanical mixture with the bond coat. Another aspect of the present application contemplates that the chemical barrier is a mechanical mixture with the top coat. Another aspect of the present application contemplates that at least one of an alkali metal oxide and an alkali earth metal oxide is from a dopant in the bond coat. Another aspect of the present application contemplates that the dopant has an initial content of greater than 0.0 wt % and less than 10 wt. %. Another aspect of the present application contemplates that the dopant has an initial content of greater than 0.1 wt % and less than/or equal to 5.0 wt. %. Another aspect of the present application contemplates that at least one of an alkali metal oxide and an alkali earth metal oxide is selected from the group consisting of $Li_2O$ and $Na_2O$. Another aspect of the present application contemplates forming gaps in the continuous network structure of the silica; which further includes applying a top coat over the bond coat; wherein the at least one of an alkali metal oxide and an alkali earth metal oxide is from a dopant in the bond coat. Another aspect of the present application contemplates that the dopant has a content of greater than 0.1 wt % and less than/or equal to 5.0 wt. %. Another aspect of the present application contemplates that the silicon containing substrate is selected from the group consisting of silicon containing ceramic, reinforced silicon containing ceramic matrix composites, silicon containing metal alloy and carbon fiber reinforced silicon carbide matrix composite.

Another form of the present application contemplates a method comprising: subjecting a silicon containing substrate coated with a bond coat including mullite to an environment suitable to cause a silica scale to form on the substrate; and creating gaps in the continuous network structure of the silica scale. Another aspect of the present application contemplates adhering the bond coat to the substrate. Another aspect of the present application contemplates the introduction of at least one of an alkali metal oxide and an alkali earth metal oxide into the silica scale. Another aspect of the present application contemplates the introduction of both an alkali metal oxide and an alkali earth metal oxide into the silica scale. Another aspect of the present application contemplates doping the bond coat with a dopant having a content greater than 0.0 wt % and less than 10 wt. %. Another aspect of the present application contemplates that the dopant is selected from the group consisting of alkali metal oxide, alkali earth metal oxide, Li, Be, Na, Mg, K, Ca, Sr, and Ba. Another aspect of the present application contemplates that the dopant is selected from the group consisting of $Li_2O$, BeO, $Na_2O$, MgO, $K_2O$, CaO, SrO, BaO and combinations thereof. Another aspect of the present application contemplates forming a second bond coat between the substrate and the bond coat, wherein the second bond coat is selected from the group consisting of silicon, metal silicides and combinations thereof; and which further includes applying a top coat over the bond coat. Another aspect of the present application contemplates forming a chemical barrier between the bond coat and the top coat. Another aspect of the present application contemplates that the chemical barrier is selected from the group consisting of $HfSiO_4$, $RE_2SiO_5$, and $RE_2Si_2O_7$ and combinations thereof. Another aspect of the present application contemplates that the silicon containing substrate is defined by a silicon containing ceramic. Another aspect of the present application contemplates that the silicon containing substrate is defined by a reinforced silicon containing ceramic matrix. Another aspect of the present application contemplates that the silicon containing substrate is defined by a silicon containing metal alloy. Another aspect of the present application contemplates that the silicon containing substrate is defined by a carbon fiber reinforced silicon carbide matrix composite. Another aspect of the present application contemplates adhering the bond coat to the substrate; wherein said creating includes the introduction of at least one of an alkali metal oxide and an alkali earth metal oxide into the silica scale; which further includes doping the bond coat with a dopant having a content greater than 0.0 wt % and less than 10 wt. %, wherein the alkali metal oxide or alkali earth metal oxide in the silica scale being from the dopant.

Another form of the present application contemplates a method comprising subjecting a silicon containing substrate coated with a mullite bond coat doped with an at least one of an alkali metal and an alkali earth metal to an environment suitable for growing a silica scale with gaps in the structure of the silica scale. Another aspect of the present application contemplates adhering the bond coat to the substrate; wherein the dopant is within a range between 0.0 wt. % and 10.0 wt. %; and which further includes introducing at least one of alkali metal oxide and an alkali earth metal oxide into the silica scale;

Another form of the present application contemplates an apparatus comprising: a silicon containing substrate having a surface; and a mullite bond coat doped with an alkali material or an alkali earth material and applied over at least a portion of said surface. Another aspect of the present application contemplates that the alkali material is an alkali metal oxide and the alkali earth material is an alkali earth metal oxide. Another aspect of the present application contemplates that the content in the dopant in the bond coat is more than zero wt. % and less than 10 wt. %. Another aspect of the present application contemplates that the content in the dopent in the bond coat is within the range of 0.1 wt. % to 5 wt. %. Another aspect of the present application contemplates a silica scale on at least a portion of the surface; and wherein the silica scale includes gaps in the continuous network structure of the silica scale. Another aspect of the present application contemplates that at least one of an alkali metal oxide and an alkali earth metal oxide pass into the silica scale. Another aspect of the present application contemplates that the bond coat is adhered to the substrate; which further includes a top coat over the bond coat. Another aspect of the present application contemplates that the top coat is selected from the group consisting of BSAS, $HfTiO_4$, $HfO_2$, $RE_2SiO_5$, $RE_2Si_2O_7$, $RE_2O_3$, $RE_2O_3$—$ZrO_2$, $RE_2O_3$—$HfO_2$, and combinations thereof. Another aspect of the present application contemplates including a chemical barrier located between the top coat and the bond coat. Another aspect of the present application contemplates that the chemical barrier is selected from the group consisting of $HfSiO_4$, $RE_2SiO_5$, and $RE_2Si_2O_7$ and combinations thereof. Another aspect of the present application contemplates that the silicon containing substrate is selected from the group consisting of silicon containing ceramic, reinforced silicon containing ceramic matrix composites, silicon containing metal alloy and carbon fiber reinforced silicon carbide matrix composite. Another aspect of the present application contemplates that the content in the dopant in the bond coat is more than zero wt. % and less than 10 wt. %; which further includes a silica scale on at least a portion of the surface; wherein the silica scale includes gaps in the continuous network structure of the silica scale; wherein at least one of an alkali metal oxide and an alkali earth metal oxide are passed into the silica scale; wherein the bond coat is adhered to the substrate; and which further includes a top coat over the bond coat.

Another form of the present application contemplates an apparatus comprising: a silicon containing substrate having a surface; and a composite mullite bond coat including a second phase oxide other than BSAS applied over said surface. Another aspect of the present application contemplates that the second phase oxide is a low modulus oxide. Another aspect of the present application contemplates that the content of the second phase oxide is within the range of 0 wt. % to 50 wt. %. Another aspect of the present application contemplates that the content of the second phase oxide is within the range of 1 wt. % to 30 wt. %. Another aspect of the present application contemplates that the second phase oxide is selected from the group consisting of oxides, doped oxides and oxide compounds of transition metals and rare earth elements. Another aspect of the present application contemplates that the second phase oxide is selected from the group consisting of $Ta_2O_5$ and $Ta_2O_5$-containing oxides, $Nb_2O_5$ and $Nb_2O_5$-containing oxides, $VO_2$ and $VO_2$-containing oxides, $TiO_2$ and $TiO_2$-containing oxides, $ZrO_2$ and $ZrO_2$-containing oxides, $HfO_2$ and $HfO_2$-containing oxides, rare earth oxides (including $Sc_2O_3$ and $Y_2O_3$) and rare earth oxide-containing oxides (including rare earth silicates), NZP family ceramics, and combinations thereof. Another aspect of the present application contemplates that the bond coat is doped with at least one of an alkali metal oxide and an alkali earth metal oxide. Another aspect of the present application contemplates including a silica scale having gaps in the continuous network structure of the silica scale. Another aspect of the present application contemplates that the bond coat is adhered to the substrate. Another aspect of the present application contemplates forming a second bond coat between the substrate and the bond coat, wherein the second bond coat is selected from the group consisting of silicon, metal suicides and combinations thereof. Another aspect of the present application contemplates a top coat over said bond coat. Another aspect of the present application contemplates that top coat is selected from the group consisting of BSAS, $HfTiO_4$, $HfO_2$, $RE_2SiO_5$, $RE_2Si_2O_7$, $RE_2O_3$, $RE_2O_3$—$ZrO_2$, $RE_2O_3$—$HfO_2$, and combinations thereof. Another aspect of the present application contemplates applying a chemical barrier between the top coat and the bond coat. Another aspect of the present application contemplates that the chemical barrier is selected from the group consisting of $HfSiO_4$, $RE_2SiO_5$, and $RE_2Si_2O_7$ and combinations thereof. Another aspect of the present application contemplates that the bond coat is adhered to the substrate; which further includes a top coat over said bond coat; and wherein the content of the second phase oxide is within the range of 1 wt. % to 30 wt. %.

Another form of the present application contemplates an apparatus comprising: a silicon containing substrate having a surface; and a composite mullite bond coat applied over said surface, said bond coat including a second phase oxide and doped with an alkali material or an alkali earth material. Another aspect of the present application contemplates that the apparatus is a gas turbine engine component. Another aspect of present application contemplates that the gas turbine engine component is selected from the group consisting of a combustor liner, blade, vane and blade track.

Another form of the present application contemplates an apparatus comprising: a silicon containing substrate having a surface; and a composite mullite bond coat including BSAS and another distinct second phase oxide applied over said surface. Another aspect of the present application contemplates that the another second phase oxide is selected from the group consisting of oxides, doped oxides and oxide compounds of transition metals and rare earth elements. Another aspect of the present application contemplates that the another second phase oxide is selected from the group consisting of $Ta_2O_5$ and $Ta_2O_5$-containing oxides, $Nb_2O_5$ and $Nb_2O_5$-containing oxides, $VO_2$ and $VO_2$-containing oxides, $TiO_2$ and $TiO_2$-containing oxides, $ZrO_2$ and $ZrO_2$-containing oxides, $HfO_2$ and $HfO_2$-containing oxides, (RE) rare earth oxides (including $Sc_2O_3$ and $Y_2O_3$) and (RE) rare earth oxide-containing oxides (including rare earth silicates), NZP family ceramics, and combinations thereof. Another aspect of the present application contemplates that the bond coat is doped with at least one of an alkali metal oxide and an alkali earth metal oxide. Another aspect of the present application contemplates that the bond coat is doped with both an alkali metal oxide and an alkali earth metal oxide. Another aspect of the present application contemplates Including a top coat over said bond coat. Another aspect of the present application contemplates that the top coat is selected from the group consisting of BSAS, $HfTiO_4$, $HfO_2$, $RE_2SiO_5$, $RE_2Si_2O_7$, $RE_2O_3$, $RE_2O_3$—$ZrO_2$, $RE_2O_3$—$HfO_2$, and combinations thereof. Another aspect of the present application contemplates applying a chemical barrier between the top coat and the bond coat. Another aspect of the present application contemplates that the chemical barrier is selected from the group consisting of $HfSiO_4$, $RE_2SiO_5$, and $RE_2Si_2O_7$ and combinations thereof.

Another form of the present application contemplates an apparatus comprising: a substrate having a surface; and a composite mullite bond coat including BSAS and another distinct second phase oxide applied over said surface. Another aspect of the present application contemplates that the bond coat is doped with at least one of an alkali metal oxide and an alkali earth metal oxide. Another aspect of the present application contemplates that the bond coat is doped with both an alkali metal oxide and an alkali earth metal oxide. Another aspect of the present application contemplates including a top coat over said bond coat. Another aspect of the present application contemplates that the top coat is selected from the group consisting of BSAS, $HfTiO_4$, $HfO_2$, $RE_2SiO_5$, $RE_2Si_2O_7$, $RE_2O_3$, $RE_2O_3$—$ZrO_2$, $RE_2O_3$—$HfO_2$, and combinations thereof. Another aspect of the present application contemplates applying a chemical barrier between the top coat and the bond coat. Another aspect of the present application contemplates that the chemical barrier is selected from the group consisting of $HfSiO_4$, $RE_2SiO_5$, and $RE_2Si_2O_7$ and combinations thereof.

Another form of the present application contemplates an apparatus comprising: a substrate having a surface; and a composite mullite bond coat applied over said surface, said bond coat including a second phase oxide and doped with an alkali material or an alkali earth material.

Another form of the present application contemplates an apparatus comprising: a substrate having a surface; and a mullite bond coat doped with an alkali material or an alkali earth material and applied over at least a portion of said surface.

Another form of the present application contemplates an apparatus comprising: a substrate having a surface; and a composite mullite bond coat including a second phase oxide other than BSAS applied over said surface.

While the invention has been illustrated and described in detail in the drawings and foregoing description, the same is to be considered illustrative and not restrictive in character, it being understood that only selected embodiments have been shown and described and that all changes, equivalents, and modifications that come within the scope of the inventions described herein or defined by the following claims are desired to be protected. Any experiments, experimental examples, or experimental results provided herein are intended to be illustrative of the present invention and should not be construed to limit or restrict the invention scope. Further, any theory, mechanism of operation, proof, or finding stated herein is meant to further enhance understanding of the present invention and is not intended to limit the present invention in any way to such theory, mechanism of operation, proof, or finding. In reading the claims, words such as "a", "an", "at least on", and "at least a portion" are not intended to limit the claims to only one item unless specifically stated to the contrary. Further, when the language "at least a portion" and/or "a portion" is used, the claims may include a portion and/or the entire item unless specifically stated to the contrary. Any patent application, publication or patent listed in this document is incorporated herein in its entirety.

What is claimed is:

1. An article comprising:
    a silicon containing substrate having a surface;
    a composite mullite bond coat including a mullite phase, a second oxide phase other than BSAS, and a dopant material over the surface, wherein the dopant material comprises at least one of an alkali metal or an alkali metal oxide, and wherein the second oxide phase comprises at least one of a transition metal oxide, a rare earth oxide, a rare earth silicate, or a NZP ceramic; and
    a silica scale between the substrate and the composite mullite bond coat and having gaps in a continuous network structure of the silica scale, wherein the silica scale includes the at least one of an alkali metal or an alkali metal oxide.

2. The article of claim 1, wherein the second oxide phase comprises an oxide having a Young's modulus lower than about 150 GPa.

3. The article of claim 1, wherein the composite mullite bond coat comprises the second oxide phase within the range of more than 0 wt. % and up to 50 wt. %.

4. The article of claim 1, wherein the composite mullite bond coat comprises the second oxide phase within the range of 1 wt. % to 30 wt. %.

5. The article of claim 1, wherein the composite mullite bond coat is doped with between 0.1 wt. % and 5 wt. % of the alkali metal oxide.

6. The article of claim 1, wherein the composite mullite bond coat is adhered to the substrate.

7. The article of claim 1, further comprising a second bond coat between the substrate and the composite mullite bond coat, wherein the second bond coat is selected from the group consisting of silicon, metal silicides, and combinations thereof.

8. The article of claim 1, further comprising a top coat over the composite mullite bond coat.

9. The article of claim 8, wherein the top coat is selected from the group consisting of BSAS, $HfTiO_4$, $HfO_2$, $RE_2SiO_5$, $RE_2Si_2O_7$, $RE_2O_3$, $RE_2O_3$—$ZrO_2$, $RE_2O_3$—$HfO_2$, and combinations thereof.

10. The article of claim 9, wherein the content of $RE_2O_3$ in $RE_2O_3$—$ZrO_2$ and $RE_2O_3$—$HfO_2$ is within the range of 4 mol % to 10 mol %.

11. The article of claim 8, further comprising a chemical barrier layer between the top coat and the composite mullite bond coat.

12. The article of claim 11, wherein the chemical barrier layer is selected from the group consisting of $HfSiO_4$, $RE_2SiO_5$, $RE_2SiO_7$, and combinations thereof.

13. The article of claim 1, wherein the composite mullite bond coat is adhered to the substrate;
    further comprising a top coat over the composite mullite bond coat; and
    wherein the composite mullite bond coat comprises between 1 wt. % and 30 wt. % of the second oxide phase.

14. The article of claim 1, wherein the article is a gas turbine engine component.

15. The article of claim 14, wherein the gas turbine engine component is selected from the group consisting of a combustor liner, blade, vane and blade track.

16. The article of claim 1, wherein the composite mullite bond coat is further doped with an alkaline earth metal oxide.

17. The article of claim 1, wherein the composite mullite bond coat further includes silicon.

* * * * *